US012809560B2

(12) United States Patent
Kibune

(10) Patent No.: US 12,809,560 B2
(45) Date of Patent: Nov. 24, 2026

(54) PRINTING CONTROL APPARATUS, CONTROL METHOD FOR PRINTING CONTROL APPARATUS, AND NON-TRANSITORY COMPUTER-READABLE STORAGE MEDIUM STORING PROGRAM

(71) Applicant: SEIKO EPSON CORPORATION, Tokyo (JP)

(72) Inventor: Shusuke Kibune, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 346 days.

(21) Appl. No.: 18/442,390

(22) Filed: Feb. 15, 2024

(65) Prior Publication Data

US 2024/0281178 A1 Aug. 22, 2024

(30) Foreign Application Priority Data

Feb. 17, 2023 (JP) ................................ 2023-023225

(51) Int. Cl.
*G06F 3/12* (2006.01)

(52) U.S. Cl.
CPC .......... *G06F 3/1208* (2013.01); *G06F 3/1256* (2013.01)

(58) Field of Classification Search
CPC ........ G06F 3/1208; G06F 3/1256; G06F 3/12; G06F 3/125; G06F 3/1278
See application file for complete search history.

(56) References Cited

U.S. PATENT DOCUMENTS

2002/0196289 A1* 12/2002 Sakamoto .......... H04N 1/32122 715/838
2015/0169271 A1* 6/2015 Kikuchi .............. G06F 3/04842 358/1.2

FOREIGN PATENT DOCUMENTS

JP 2012-027632 A 2/2012
JP 2015-069360 * 4/2015

OTHER PUBLICATIONS

Machine translation for JP 2012-027632, IDS (Year: 2012).*
Machine translation for JP 2015-069360 (Year: 2015).*

* cited by examiner

*Primary Examiner* — Qian Yang
(74) *Attorney, Agent, or Firm* — WORKMAN NYDEGGER

(57) ABSTRACT

There is provided a printing control apparatus that controls printing, the printing control apparatus including an input unit configured to receive input of printing target data and a display control unit configured to cause a display unit to display a preview image corresponding to the printing target data, the input of which has been received by the input unit. The display control unit causes, based on the printing target data, the display unit to display a first preview image or a second preview image having color reproduction precision higher than color reproduction precision of the first preview image.

8 Claims, 7 Drawing Sheets

PRINTING CONTROL APPARATUS, CONTROL METHOD FOR PRINTING CONTROL APPARATUS, AND NON-TRANSITORY COMPUTER-READABLE STORAGE MEDIUM STORING PROGRAM

The present application is based on, and claims priority from JP Application Serial Number 2023-023225, filed Feb. 17, 2023, the disclosure of which is hereby incorporated by reference herein in its entirety.

BACKGROUND

1. Technical Field

The present disclosure relates to a printing control apparatus, a control method for a printing control apparatus, and a non-transitory computer-readable storage medium storing a program.

2. Related Art

There has been known a technique for displaying a preview, which is an image of a printing result. For example, JP-A-2012-27632 discloses a technique for providing several stages of drawing setting from a low-resolution preview image to a high-resolution preview image.

There is a demand for differentiating color reproduction precision according to a printing target in preview display. For example, depending on a printing target, there is a demand for quickly displaying a preview even if color reproduction precision is low or a demand for displaying a preview with high color reproduction precision even if display takes time. JP-A-2012-27632 cannot meet the demand because it is not considered to differentiate color reproduction precision of a preview image according to a printing target. There is a problem in that convenient preview display cannot be performed.

SUMMARY

According to an aspect of the present disclosure, there is provided a printing control apparatus that controls printing, the printing control apparatus including: an input unit configured to receive input of printing target data; and a display control unit configured to cause a display unit to display a preview image corresponding to the printing target data, the input of which was received by the input unit. The display control unit causes, based on the printing target data, the display unit to display a first preview image or a second preview image having color reproduction precision higher than color reproduction precision of the first preview image.

According to another aspect of the present disclosure, there is provided a control method for a printing control apparatus that controls printing, the control method including: an input step for receiving input of printing target data; and a display control step for causing a display unit to display a preview image corresponding to the printing target data, the input of which was received in the input step. In the display control step, based on the printing target data, the display unit is caused to display a first preview image or a second preview image having color reproduction precision higher than color reproduction precision of the first preview image.

According to another aspect of the present disclosure, there has been a non-transitory computer-readable storage medium storing a program for causing a processor of a printing control apparatus, which controls printing, to function as: an input unit configured to receive input of printing target data; and a display control unit configured to cause a display unit to display a preview image corresponding to the printing target data, the input of which was received by the input unit. The display control unit causes, based on the printing target data, the display unit to display a first preview image or a second preview image having color reproduction precision higher than color reproduction precision of the first preview image.

DESCRIPTION OF EMBODIMENTS

1. First Embodiment

A printing control apparatus 1 according to a first embodiment is explained below with reference to the drawings.

1-1. Overall Configuration of a Printing System

Figure 1:
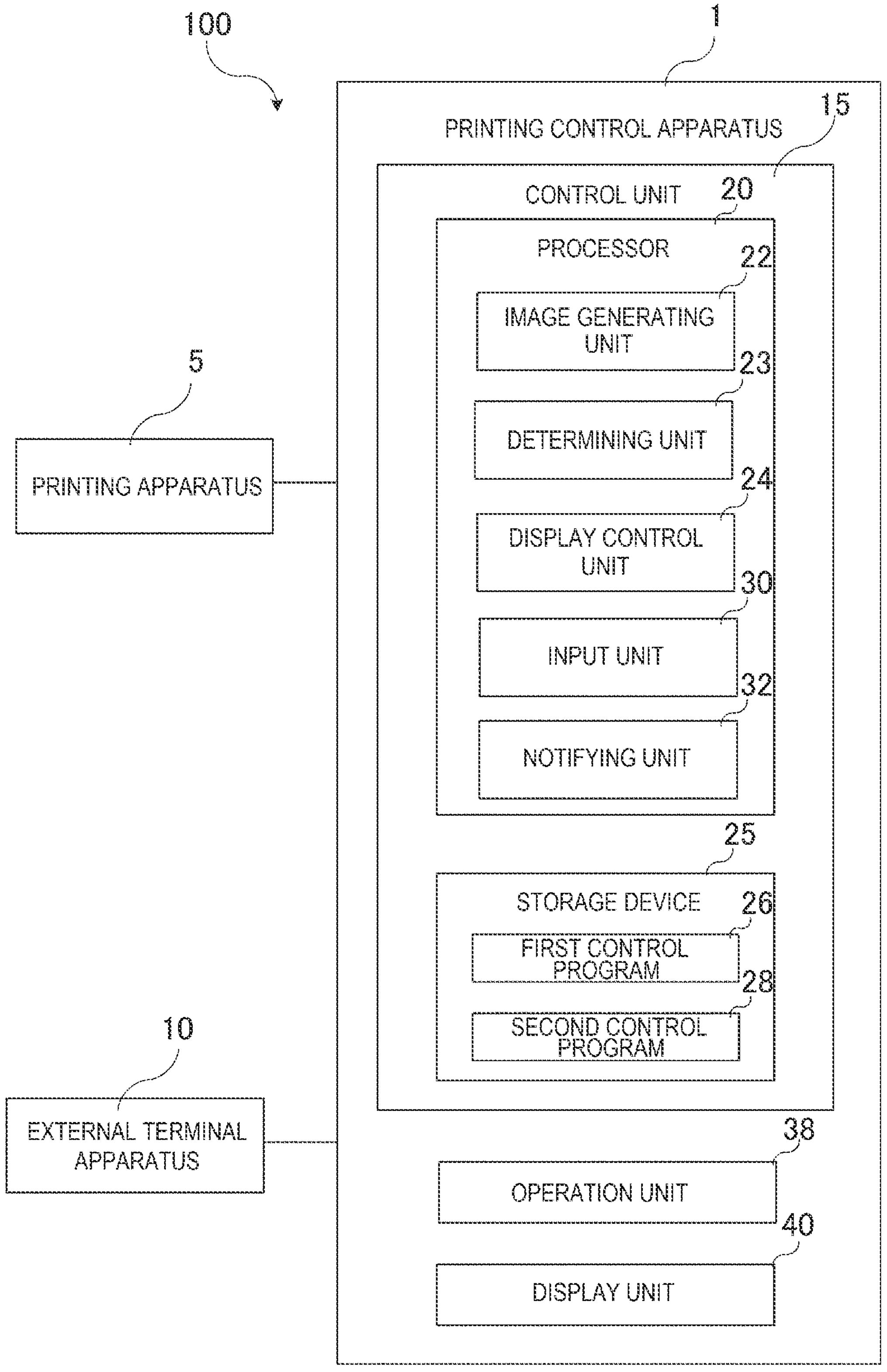
FIG. 1 is a block diagram showing a configuration of a printing system.

FIG. 1 is a block diagram showing a configuration of a printing system 100 according to the first embodiment.

The printing system 100 includes a printing apparatus 5 that performs printing on a printing medium, an external terminal apparatus 10 that transmits printing target data indicating an image to be printed on the printing medium, and a printing control apparatus 1 that controls the printing of the printing apparatus 5. The printing apparatus 5 is an inkjet printing apparatus that ejects ink from a printing head and performs printing. The external terminal apparatus 10 is a so-called personal computer. The printing control apparatus 1 includes a not-shown interface circuit in order to exchange information with the printing apparatus 5 and the external terminal apparatus 10 and communicates with the printing apparatus 5 and the external terminal apparatus 10 via the interface circuit.

The printing control apparatus 1 includes a display unit 40, an operation unit 38, and a control unit 15.

The operation unit 38 includes input means such as a keyboard and a mouse and detects operation of a user on the input means and outputs the operation to the control unit 15. The control unit 15 executes, based on input from the operation unit 38, processing corresponding to the operation of the user on the input means.

The display unit 40 is configured with a display and displays various kinds of information according to control of the control unit 15.

The control unit 15 includes a processor 20 such as a CPU (Central Processing Unit) and a storage device 25.

The storage device 25 is configured with a memory device such as a RAM (Random Access Memory) or an HDD (Hard Disk Drive) and stores data and programs. The storage device 25 stores a first control program 26 and a second control program 28.

The first control program 26 corresponds to an example of the "program".

The processor 20 executes the first control program 26 and the second control program 28 to implement various functions.

The processor 20 reads and executes the first control program 26 to function as a determining unit 23, a display control unit 24, an input unit 30, and a notifying unit 32.

Further, the processor 20 reads and executes the second control program 28 to function as an image generating unit 22.

First, the display control unit 24 is explained.

The display control unit 24 causes the display unit 40 to display a preview display screen PGM. The preview display screen PGM is a screen for displaying a preview image PG, which is an image of a printing target indicated by printing target data.

Figure 2:
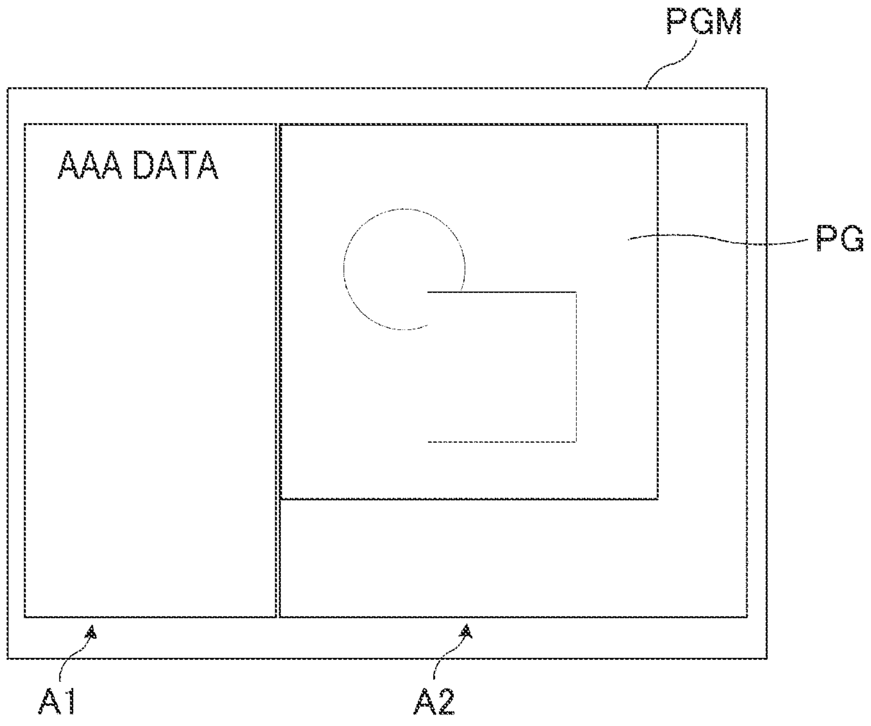
FIG. 2 is a conceptual diagram illustrating an operation in an input unit.

FIG. 2 is a diagram showing an example of the preview display screen PGM.

The preview display screen PGM includes an input region A1 for inputting printing target data to the preview display screen PGM and a display region A2 for displaying the preview image PG corresponding to the printing target data input to the input region A1.

Subsequently, the input unit 30 is explained.

The input unit 30 receives input of printing target data to the input region A1. When the operation unit 38 detects drag-and-drop of the printing target data to the input region A1, the input unit 30 receives input of the printing target data to the preview display screen PGM.

Subsequently, the determining unit 23 is explained.

The determining unit 23 performs various kinds of determination explained below.

Subsequently, the notifying unit 32 is explained.

When the display control unit 24 is causing the display unit 40 to display a low-precision preview image explained below on the preview display screen PGM, the notifying unit 32 notifies that color reproduction precision of the preview image PG is low.

The low-precision preview image corresponds to an example of the "first preview image".

Figure 3:
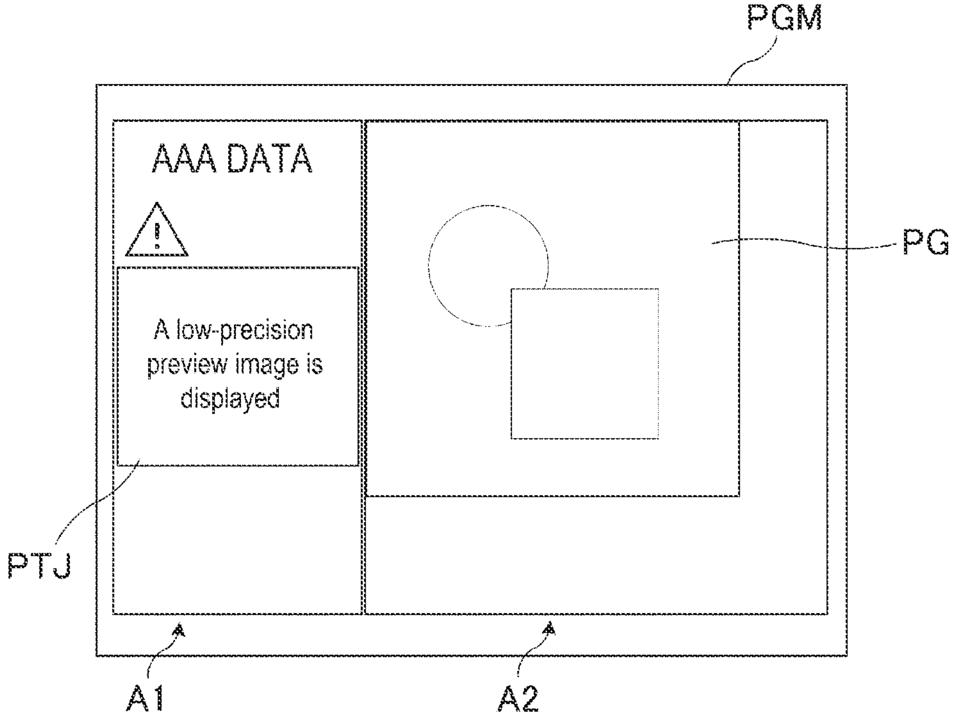
FIG. 3 is an explanatory diagram of a preview display screen for displaying a low-precision preview image.

FIG. 3 is a diagram illustrating notification of the notifying unit 32.

The notifying unit 32 displays, in the input region A1, notification information PTJ indicating that the color reproduction precision of the preview image PG is low. Note that the notifying unit 32 only has to display the notification information PTJ on the preview display screen PGM. Therefore, a display position of the notification information PTJ is not limited to a display position shown in FIG. 3.

Subsequently, the image generating unit 22 is explained.

The image generating unit 22 performs processing for generating data for printing (CMYK values) obtained by reflecting, on printing target data, characteristics of the printing apparatus 5 and a medium used for printing using an input profile for converting an input color into a color value on a specific color space and an output profile for converting the color value on the specific color space into a color value corresponding to an output characteristic of the printing apparatus 5 and the characteristics of the medium and processing for subjecting printing target data input to the preview display screen PGM explained below to image processing to generate the preview image PG. As the preview image PG generated by the image generating unit 22, there are two types of a low-precision preview image and a high-precision preview image. The high-precision preview image is the preview image PG having color reproduction precision of a printing target indicated by the printing target data higher than color reproduction precision of the low-precision preview image.

The high-precision preview image corresponds to an example of the "second preview image".

The low-precision preview image is the preview image PG on which color conversion by an ICC profile is not performed and is the preview image PG having lower color reproduction precision for a printing target to be actually printed compared with the high-precision preview image.

The image generating unit 22 has a different generation method for a low-precision preview image according to a data format of printing target data. When the data format of the printing target data is a PDF format or an EPS format, the image generating unit 22 extracts thumbnail data included in PDF data or EPS data and generates, as the low-precision preview image, a thumbnail indicated by the extracted thumbnail data. When the data format of the printing target data is any one of a TIFF format, a JPEG format, and a PNG format, the image generating unit 22 generates a thumbnail of a printing target using an OS standard library and generates the generated thumbnail as the low-precision preview image.

The high-precision preview image is the preview image PG on which the color conversion by the ICC profile is performed and is the preview image PG having higher color reproduction precision for a printing target to be actually printed compared with the low-precision preview image.

The image generating unit 22 performs the color conversion by the ICC profile on printing target data to generate a high-precision preview image. Specifically, the image generating unit 22 obtains CMYK values obtained by reflecting characteristics of the printing apparatus 5 and a medium on an image (RGB values) of the printing target data using an input profile and an output profile. Further, the image generating unit 22 converts the CMYk values into color values on a specific color space obtained by reflecting the characteristics of the printing apparatus 5 and the medium on the CMYK values using the output profile and converts the color values into data (RGB values) of the high-precision preview image using a monitor profile corresponding to an output characteristic of the display unit 40.

1-2. Operation of the Printing Control Apparatus

Figure 4:
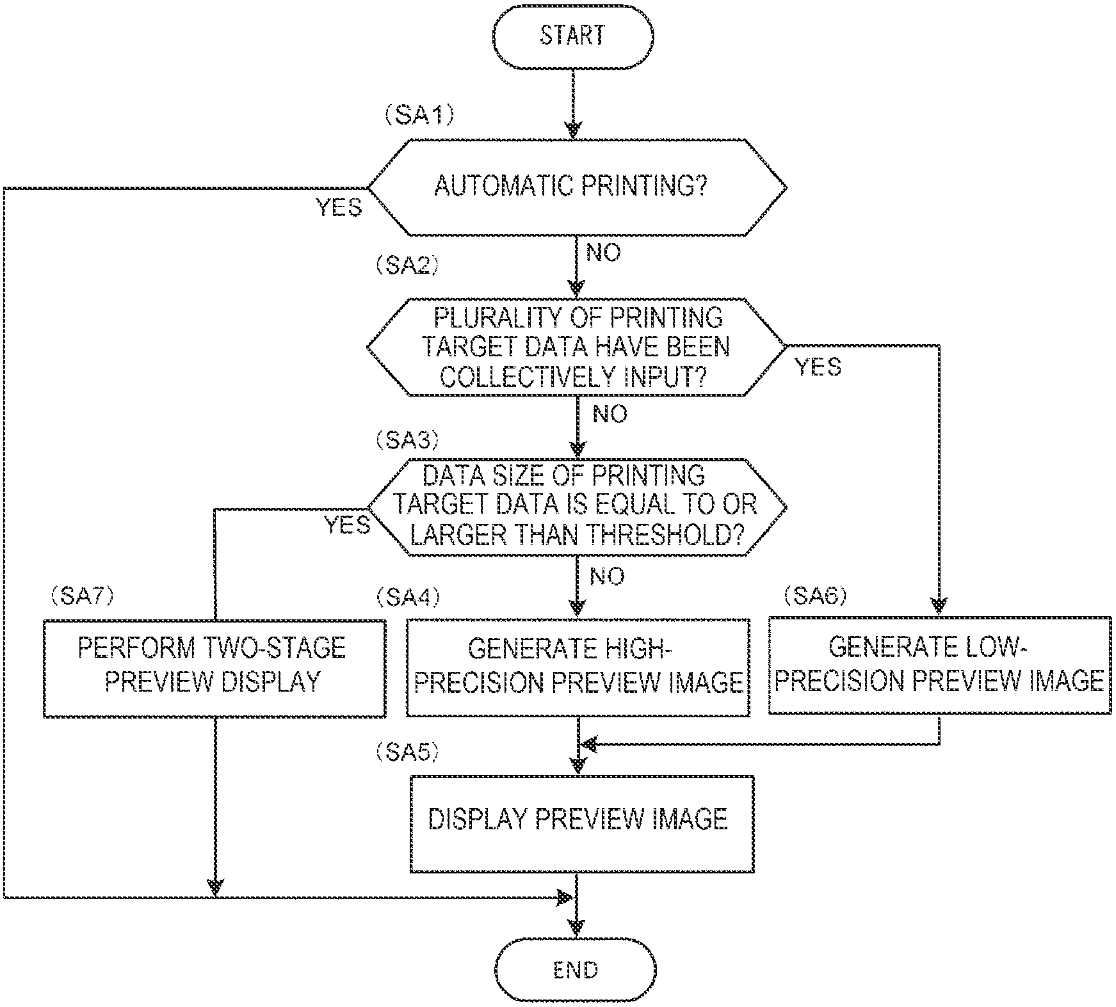
FIG. 4 is a flowchart illustrating an operation of a printing control apparatus according to a first embodiment.

FIG. 4 is a flowchart showing an operation of the printing control apparatus 1.

First, the determining unit 23 determines whether to perform automatic printing for causing the printing apparatus 5 to execute printing without displaying a preview (step SA1). The user inputs indication about whether to perform the automatic printing to the printing control apparatus 1 when the user inputs printing target data. Note that whether to perform the automatic printing may be set in the printing control apparatus 1 in advance.

When determining not to perform the automatic printing (NO in step SA1), the determining unit 23 determines whether the input unit 30 has received collective input of a plurality of printing target data (step SA2).

When determining that the input unit 30 has not received collective input of a plurality of printing target data (NO in step SA2), the determining unit 23 determines whether a data size of printing target data, input of which has been received by the input unit 30, is equal to or larger than a predetermined threshold (step SA3). When the determining unit 23 determines that the data size of the printing target data is smaller than the predetermined threshold (NO in step SA3), the display control unit 24 causes the image generating unit 22 to generate a high-precision preview image for the printing target data received by the input unit 30 (step SA4). Subsequently, the display control unit 24 displays the high-precision preview image generated in step SA4 on the preview display screen PGM (step SA5).

Referring back to step SA1, when the determining unit 23 determines to perform the automatic printing (YES in step SA1), the processor 20 does not execute processing relating to display of the preview image PG. Note that, when affirmative determination is made in step SA1, the processor 20 performs the automatic printing in the printing apparatus 5.

Referring back to step SA2, if the determining unit 23 determines that the input unit 30 has received collective input of a plurality of printing target data (YES in step SA2), the display control unit 24 causes the image generating unit 22 to generate a low-precision preview image for each of the collectively input printing target data (step SA6). Subsequently, the display control unit 24 displays the low-precision preview image generated in step SA6 on the preview display screen PGM (step SA5).

Referring back to step SA3, if the determining unit 23 determines that the data size of the printing target data is equal to or larger than the predetermined threshold (YES in step SA3), the processor 20 performs two-stage preview display (step SA7).

The two-stage preview display indicates that a high-precision preview image is displayed after a low-precision preview image is displayed.

When the data size of the printing target data is equal to or larger than the predetermined threshold, a generation time of the high-precision preview image increases because a processing load of data is large. Therefore, in this case, when only the high-precision preview image is displayed, a time is required until the user can view the preview image PG and work efficiency concerning printing can be deteriorated. Therefore, the printing control apparatus 1 performs the two-state preview display.

Specifically, the printing control apparatus 1 performs the two-stage preview display as explained below.

The display control unit 24 causes the image generating unit 22 to generate a low-precision preview image. Subsequently, the display control unit 24 displays the generated low-precision preview image. After displaying the low-precision preview image, when the preview display screen PGM is not operated for a predetermined time or more, the display control unit 24 causes the image generating unit 22 to generate a high-precision preview image for the printing target data. The display control unit 24 displays the generated high-precision preview image instead of the low-precision preview image. Note that the predetermined time is, for example, five minutes.

1-3. Effects

As explained above, the printing control apparatus 1 according to the first embodiment includes the input unit 30 that receives input of printing target data and the display control unit 24 that causes the display unit 40 to display a preview image corresponding to the printing target data, the input of which has been received by the input unit 30. The display control unit 24 causes, based on the printing target data, the display unit 40 to display a low-precision preview image or a high-precision preview image having color reproduction precision higher than color reproduction precision of the low-precision preview image.

Consequently, since the preview image PG having different color reproduction precision can be displayed according to a printing target, it is possible to perform convenient preview display.

The printing control apparatus 1 includes the image generating unit 22 that performs image processing on the printing target data to thereby generate a high-precision preview image. When having caused the display unit 40 to display a low-precision preview image, the display control unit 24 causes the image generating unit 22 to execute the image processing during the display of the low-precision preview image. After executing the image processing, the display control unit 24 causes the display unit 40 to display a high-precision preview image instead of the low-precision preview image.

Consequently, since the low-precision preview image can be displayed on the display unit 40 before the display of the high-precision preview image, the user can quickly view a preview of a printing target. Since the high-precision preview image is displayed, the user can view a preview close to an actual printing result. Accordingly, it is possible to prevent a difference from occurring between a printing result grasped by the user and the actual printing result while preventing work efficiency of the user from being deteriorated.

When the data size of the printing target data is equal to or larger than the predetermined threshold, the display control unit 24 causes the display unit 40 to display a low-precision preview image first and subsequently causes the display unit 40 to display a high-precision preview image instead of the low-precision preview image. When the data size of the printing target data is smaller than the threshold, the display control unit 24 causes the display unit 40 to display the high-precision preview image without causing the display unit 40 to display the low-precision preview image.

Consequently, a type of the preview image PG is distinguished according to the data size of the printing target data. Therefore, it is possible to prevent a difference from occurring between a printing result grasped by the user and an actual printing result while achieving quick preview viewing.

In the printing control apparatus 1, when the input unit 30 receives collective input of a plurality of printing target data, the display control unit 24 causes the display unit 40 to display a low-precision preview image and does not cause the display unit 40 to display a high-precision preview image.

Consequently, when the plurality of printing target data are collectively input, it is possible to automatically select display of the low-precision preview image, for image processing for which resources are less consumed. Therefore, it is possible to quickly display the preview image PG for the plurality of printing target data. It is possible to prevent work efficiency of the user from being deteriorated.

The printing control apparatus 1 includes the notifying unit 32 that, when the display control unit 24 causes the display unit 40 to display a low-precision preview image, notifies that color reproduction precision of a preview image is low.

Consequently, it is possible to clearly indicate that a preview image displayed on the display unit 40 is not a high-precision preview image having high color reproduction precision. Therefore, there is an effect that it is easy to prevent a printing accident in which a print is created at printing quality lower than a level expected by the user.

A control method for the printing control apparatus 1 that controls printing includes an input step for receiving input of printing target data and a display control step for causing the display unit 40 to display the preview image PG corresponding to the printing target data, the input of which has been received in the input step. In the display control step, based on the printing target data, the display unit 40 is caused to display a low-precision preview image or a high-precision preview image having color reproduction precision higher than color reproduction precision of the low-precision preview image.

Consequently, it is possible to display the preview image PG having different color reproduction precision according to a printing target. Therefore, it is possible to perform convenient preview display.

A non-transitory computer-readable storage medium storing a program, the program causing the processor 20 of the printing control apparatus 1, which controls printing, to function as the input unit 30 that receives input of printing target data and the display control unit 24 that causes the display unit 40 to display the preview image PG corresponding to the printing target data, the input of which has been received by the input unit 30. The display control unit 24 causes, based on the printing target data, the display unit 40 to display a low-precision preview image or a high-precision preview image having color reproduction precision higher than color reproduction precision of the low-precision preview image.

Consequently, it is possible to display the preview image PG having different color reproduction precision according to a printing target. Therefore, it is possible to perform convenient preview display.

2. Second Embodiment

The printing control apparatus 1 according to a second embodiment is explained below with reference to the drawings.

2-1. Configuration of a Switching Button

Components of units of the printing system 100 according to the second embodiment are the same as the components in the first embodiment. Therefore, explanation of the components is omitted as appropriate.

The second embodiment is different from the first embodiment in opportunity to switch the preview image PG in the two-stage preview display. In the first embodiment, the low-precision preview image is switched to the high-precision preview image at the opportunity of the elapse of the predetermined period. In the second embodiment, the low-precision preview image is switched to the high-precision preview image at the opportunity of operation for a switching button 50.

Figure 5:
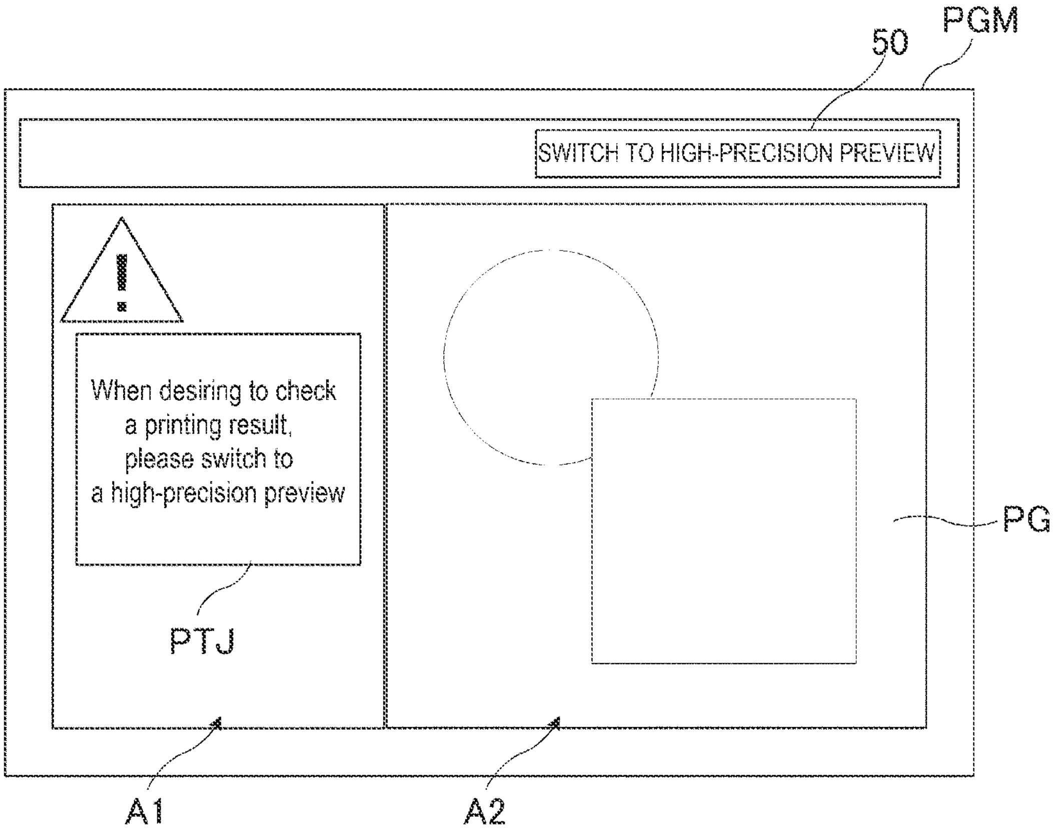
FIG. 5 is an explanatory diagram of a display unit on which a switching button is displayed.

FIG. 5 is a diagram showing an example of the switching button 50.

The switching button 50 is a software button for switching the preview image PG from a low-precision preview image to a high-precision preview image.

When generation of a high-precision preview image is completed, the switching button 50 is operably displayed.

Note that, in FIG. 5, the switching button 50 is illustrated as a software button displayed on the preview display screen PGM. However, the switching button 50 is only an example and may be a context menu button.

2-2. Operation of the Printing Control Apparatus According to the Second Embodiment As explained above, the second embodiment is different from the first embodiment in opportunity to switch the preview image PG in the two-stage preview display. In the first embodiment, the low-precision preview image is switched to the high-precision preview image at the opportunity of the elapse of the predetermined period. In the second embodiment, the low-precision preview image is switched to the high-precision preview image at the opportunity of operation for the switching button 50.

Figure 6:
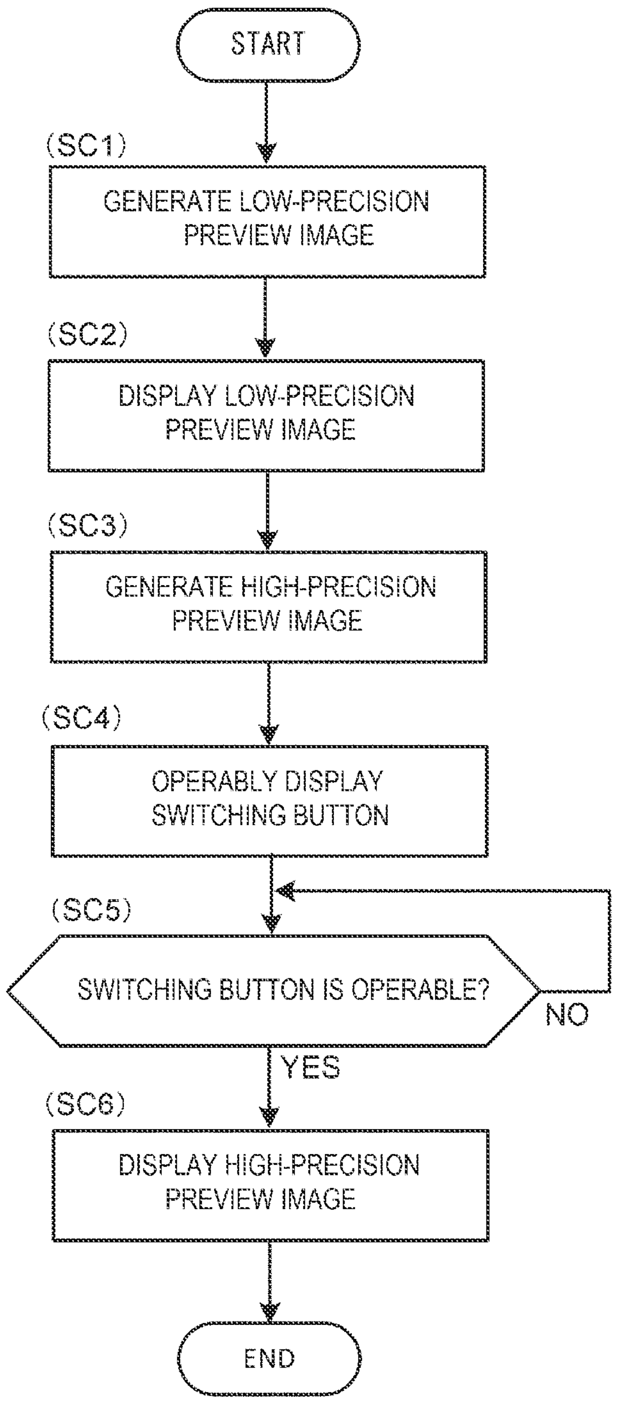
FIG. 6 is a flowchart illustrating an operation of a printing control apparatus according to a second embodiment.

FIG. 6 is a flowchart showing an operation of the printing control apparatus 1 in the two-stage preview display.

The display control unit 24 causes the image generating unit 22 to generate a low-precision preview image (step SC1). Subsequently, the display control unit 24 displays the generated low-precision preview image (step SC2). Subsequently, the display control unit 24 causes the image generating unit 22 to generate a high-precision preview image (step SC3). Subsequently, the display control unit 24 operably displays the switching button 50 (step SC4). Subsequently, the determining unit 23 determines whether the switching button 50 displayed on the display unit 40 has been operated by a user (step SC5). When the determining unit 23 determines that the switching button 50 displayed on the display unit 40 has been operated by the user (YES in step SC5), the printing control apparatus 1 displays a high-precision preview image on the display unit 40 (step SC6).

2.3. Effects

In the printing control apparatus 1 according to the second embodiment, when causing the display unit 40 to display a low-precision preview image, the display control unit 24 performs control for causing the display unit 40 to display the switching button 50 for switching display of a low-precision preview image to display of a high-precision preview image after execution of image processing. When the determining unit 23 determines that the switching button 50 has been operated, the display control unit 24 switches the display of the low-precision preview image to the display of the high-precision preview image.

Consequently, the user can select the preview image PG having high color reproduction precision. Therefore, it is possible to perform more convenient preview display.

3. Third Embodiment

The printing control apparatus 1 according to a third embodiment is explained below with reference to the drawings.

3-1. Overall Configuration of the Printing System

A configuration of the printing system 100 including the printing control apparatus 1 according to the third embodiment is substantially the same as the configuration in the first embodiment. Therefore, explanation of the configuration is omitted. However, the storage device 25 stores a printer driver, which is a program capable of displaying a preview of printing target data. The printing driver is not a driver that transmits data to the printing apparatus 5 but is a driver that delivers data to the first control program 26. The first control program 26 has a function of a hot folder for the printer driver to transmit data to the first control program 26. When the printer driver inputs printing target data to the hot folder, the input unit 30 receives input of the printing target data to the preview display screen PGM. When one or a plurality of files are stored in the hot folder displayed on the display unit 40 by user operation, the input unit 30 receives input of these files as the printing target data.

The image generating unit 22 generates, for the printing target data input from the printer driver, an image of a frame indicating a size of a printing target used for checking imposition and a layout. The display control unit 24 displays, for the printing target data input from the printer driver, the image of the frame on the preview display screen PGM.

3-2. Operation of the Printing Apparatus According to the Third Embodiment

Figure 7:
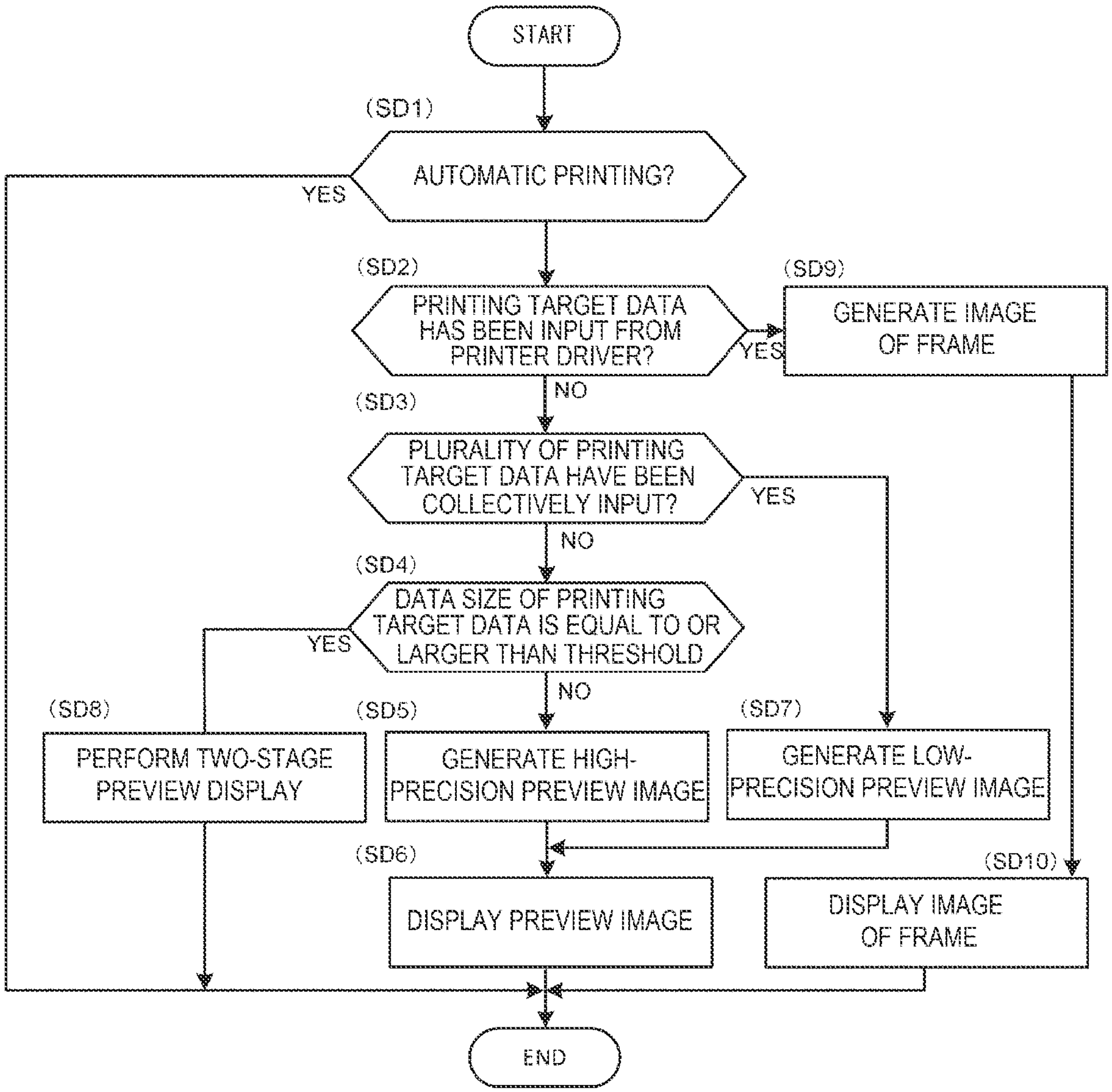
FIG. 7 is a flowchart illustrating an operation of a printing control apparatus according to a third embodiment.

FIG. 7 is a flowchart illustrating an operation of the printing control apparatus 1 according to the third embodiment.

First, the determining unit 23 determines whether the printing apparatus 5 performs automatic printing (step SD1).

When determining that the printing apparatus 5 does not perform the automatic printing (NO in step SD1), the determining unit 23 determines whether input printing target data is printing target data input from the printer driver (step SD2). When determining that the input printing target data is not printing target data input from the printer driver (NO in step SD2), the determining unit 23 determines whether the input unit 30 has received collective input of a plurality of printing target data, that is, whether a plurality of files have been stored in the hot folder (step SD3).

When the determining unit 23 determines that the input unit 30 has not received collective input of a plurality of printing target data (NO in step SD3), the determining unit 23 determines whether a data size of printing target data, input of which has been received by the input unit 30, is equal to or larger than a predetermined threshold (step SD4). When the determining unit 23 determines that the data size of the printing target data is smaller than the predetermined threshold (NO in step SD4), the display control unit 24 causes the image generating unit 22 to generate a high-precision preview image for the printing target data received by the input unit 30 (step SD5). Subsequently, the display control unit 24 displays the high-precision preview image generated in step SD5 on the preview display screen PGM (step SD6).

Referring back to step SD1, when the determining unit 23 determines that the printing apparatus 5 performs the automatic printing (YES in step SD1), the processor 20 does not execute processing relating to display of the preview image PG. Note that, when affirmative determination is made in step SD1, the processor 20 performs the automatic printing in the printing apparatus 5.

Referring back to step SD2, when the determining unit 23 determines that the input printing target data is the printing target data input from the printer driver (YES in step SD2), the display control unit 24 causes the image generating unit 22 to generate an image of a frame indicating a size of a printing target (step SD9). Subsequently, the display control unit 24 displays the image of the frame generated in step SD9 in the display region A2 (step SD10). Note that, in step SD10, the printer driver displays a preview corresponding to the printing target data input to the hot folder.

Referring back to step SD3, when the determining unit 23 determines that the input unit 30 has received collective input of a plurality of printing target data (YES in step SD3), the display control unit 24 causes the image generating unit 22 to generate a low-precision preview image for each of the collectively input printing target data (step SD7). Subsequently, the display control unit 24 displays the low-precision preview image generated in step SD7 on the preview display screen PGM (step SD6).

Referring back to step SD4, when the determining unit 23 determines that the data size of the printing target data is equal to or larger than the predetermined threshold (YES in step SD4), the processor 20 performs the two-stage preview display (step SD8).

3-3. Effects

The printing control apparatus 1 according to the third embodiment includes the storage device 25 that stores a printer driver, which is a program capable of displaying the preview image PG. When printing target data has been acquired from the printer driver, the display control unit 24 causes the display unit 40 to display a printing data display frame of an image corresponding to the printing target data without displaying a low-precision preview image or a high-precision preview image.

Consequently, when the printer driver can display a preview, since the preview image PG is not displayed, it is possible to reduce a processing load of the printing control apparatus 1 while preventing display of overlapping previews. Since an image of a frame is displayed, processing such as check of imposition and a layout can be performed. Accordingly, it is possible to prevent work efficiency relating to printing of a user from being deteriorated while preventing display of overlapping previews and reducing a processing load of the printing control apparatus 1.

Note that it is naturally possible to add various changes within a range not departing from the gist without being limited to the embodiments explained above.

The functions of the processor 20 may be implemented by a plurality of processors or semiconductor chips.

Note that, in this embodiment, the notification information PTJ is displayed on the display unit 40 to visually notify that the preview image PG is the low-precision preview image. However, a method of notification is not limited to this. For example, the notifying unit 32 including a speaker capable of outputting voice may be provided to warn by voice.

In the embodiments explained above, an inkjet scheme is illustrated as a printing scheme of the printing apparatus 5. However, the printing scheme of the printing apparatus 5 is not limited to the inkjet scheme and may be another printing scheme such as an electrophotographic scheme.

Processing units of the flowcharts shown in FIGS. 4, 6, and 7 are divided according to main processing contents in order to facilitate understanding of the processing of the control unit 15. The present disclosure is not limited by a method of division and names of the processing units. According to processing content, the operations shown in FIGS. 4, 6, and 7 can also be divided into a larger number of processing units or can also be divided such that one processing unit includes a larger number of kinds of processing. The processing orders of the flowcharts are not limited to the illustrated ones.

The units shown in FIG. 1 are examples and are not particularly limited. Hardware individually corresponding to the units does not always need to be implemented. It is also naturally possible to adopt a configuration in which one processor executes a program to implement the functions of the units. A part of functions implemented by software may be implemented by hardware or a part of functions implemented by hardware may be implemented by software. Besides, specific detailed components of the other units can be optionally changed for the printing control apparatus 1.

What is claimed is:

1. A printing control apparatus that controls printing, the printing control apparatus comprising:

an input unit configured to receive input of printing target data; and a display control unit configured to cause a display unit to display a preview image corresponding to the printing target data, the input of which was received by the input unit, wherein the display control unit causes, based on the printing target data, the display unit to display a first preview image or a second preview image having color reproduction precision higher than color reproduction precision of the first preview image, when a data size of the printing target data is equal to or larger than a predetermined threshold, the display control unit causes the display unit to display the first preview image first and subsequently causes the display unit to display the second preview image instead of the first preview image, and when the data size of the printing target data is smaller than the predetermined threshold, the display control unit causes the display unit to display the second preview image without causing the display unit to display the first preview image.

2. The printing control apparatus according to claim 1, further comprising an image generating unit configured to generate the second preview image by performing image processing on the printing target data, wherein when causing the display unit to display the first preview image, the display control unit causes the image generating unit to execute the image processing during the display of the first preview image and, after the image processing is executed, causes the display unit to display the second preview image instead of the first preview image.

3. The printing control apparatus according to claim 2, wherein when causing the display unit to display the first preview image, the display control unit performs control for causing the display unit to display a switching button for switching the display of the first preview image to the display of the second preview image after the execution of the image processing, and when a determining unit determines that the switching button has been operated, the display control unit switches the display of the first preview image to the display of the second preview image.

4. The printing control apparatus according to claim 1, wherein, when the input unit receives collective input of a plurality of the printing target data, the display control unit causes the display unit to display the first preview image and does not display the second preview image.

5. The printing control apparatus according to claim 1, further comprising a notifying unit configured to notify, when the display control unit is causing the display unit to display the first preview image, that color reproduction precision of a preview image is low.

6. The printing control apparatus according to claim 1, further comprising a storage device configured to store a program capable of displaying a preview corresponding to the printing target data, the program being a printer driver that transmits the printing target data to the display control unit, wherein when the printing target data is acquired from the printer driver, the display control unit causes the display unit to display a frame indicating a size of a printing target indicated by the printing target data without displaying the first preview image or the second preview image.

7. A control method for a printing control apparatus that controls printing, the control method comprising:

receiving input of printing target data; and causing a display unit to display a preview image corresponding to the printing target data, the input of which was received, wherein in displaying the preview image, based on the printing target data, the display unit is caused to display a first preview image or a second preview image having color reproduction precision higher than color reproduction precision of the first preview image, when a data size of the printing target data is equal to or larger than a predetermined threshold, the display control unit causes the display unit to display the first preview image first and subsequently causes the display unit to display the second preview image instead of the first preview image, and when the data size of the printing target data is smaller than the predetermined threshold, the display control unit causes the display unit to display the second preview image without causing the display unit to display the first preview image.

8. A non-transitory computer-readable storage medium storing a program for causing a processor of a printing control apparatus, which controls printing, to function as:

an input unit configured to receive input of printing target data; and a display control unit configured to cause a display unit to display a preview image corresponding to the printing target data, the input of which was received by the input unit, wherein the display control unit causes, based on the printing target data, the display unit to display a first preview image or a second preview image having color reproduction precision higher than color reproduction precision of the first preview image, when a data size of the printing target data is equal to or larger than a predetermined threshold, the display control unit causes the display unit to display the first preview image first and subsequently causes the display unit to display the second preview image instead of the first preview image, and when the data size of the printing target data is smaller than the predetermined threshold, the display control unit causes the display unit to display the second preview image without causing the display unit to display the first preview image.

* * * * *